UNITED STATES PATENT OFFICE.

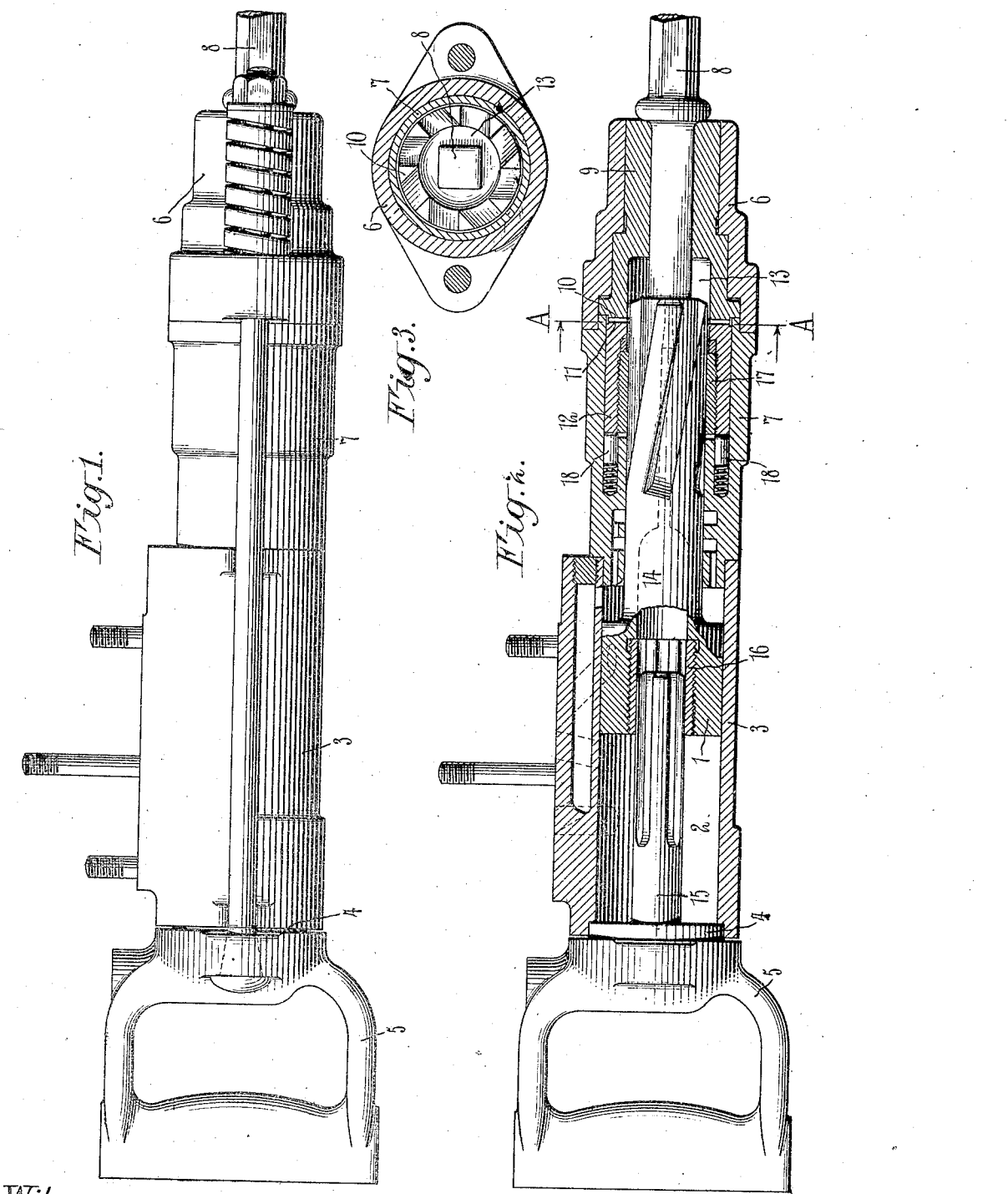

JOHN U. ADOLPH, OF EASTON, PENNSYLVANIA, ASSIGNOR TO INGERSOLL-RAND COMPANY, OF NEW YORK, N. Y., A CORPORATION OF NEW JERSEY.

PERCUSSIVE TOOL.

1,113,729.

Specification of Letters Patent.

Patented Oct. 13, 1914.

Application filed February 6, 1912. Serial No. 675,887.

*To all whom it may concern:*

Be it known that I, JOHN U. ADOLPH, a citizen of the United States, and resident of Easton, in the county of Northampton and State of Pennsylvania, have invented a new and useful Improvement in Percussive Tools, of which the following is a specification.

The object of my invention is to provide a novel form of rotation for percussive tools.

In the accompanying drawings, Figure 1 represents a percussive tool of the piston hammer type for which my rotation is applied, Fig. 2 is a longitudinal central section through the same, and Fig. 3 is a transverse section taken in the plane of the line A—A of Fig. 2.

The work piston is denoted by 1 and the chamber within which it reciprocates by 2. The tool cylinder is denoted by 3, its back head by 4, and handle by 5. The front head of the tool is divided into front and rear members 6, 7. The square end of the drill steel shank 8 is seated within the chuck 9, which chuck is rotatably mounted in the front member 6 of the front head. The back end of this chuck is provided with an annular series of ratchet teeth 10, which teeth are engaged by the teeth 11 on the front end of a forwardly spring pressed oscillating sleeve 12 mounted in the front end of member 7 of the front head. The shank 8 of the tool steel projects into an enlarged bore 13 of the chuck 9 in position to be struck by the extension 14 of the work piston 1. The reciprocating movement of the piston 1 imparts a step by step rotary movement to the chuck 9 as the piston has a straight tongue and groove connection with the cylinder, and a spiral tongue and groove connection with the oscillating sleeve 12. The straight tongue and groove connection between the piston and cylinder is provided for by a straight grooved bar 15 fast to the back head 4, which bar projects axially into a nut 16 carried by the piston 1.

The spiral tongue and groove connection between the piston 1 and sleeve 10 is provided for by causing the rifled portion of the extension 14 to engage a nut 17 carried by the said sleeve 12. This ratchet sleeve 12 is forced forwardly into engagement with the chuck 9 by spring pressed plungers 18 engaging the back end of said sleeve.

What I claim is:—

1. In a percussive tool, a rotary chuck, an oscillating sleeve, a driving connection between the sleeve and chuck, a reciprocating work piston having a spiral tongue and groove connection with the sleeve for oscillating it and means preventing the piston from rotating comprising a fixed bar having a straight tongue and groove connection with said piston.

2. In a percussive tool, a rotary chuck, an oscillating sleeve, a clutch connection between the sleeve and chuck, a reciprocating work piston having a spiral tongue and groove connection with the sleeve for oscillating it and means preventing the piston from rotating comprising a fixed bar having a straight tongue and groove connection with the piston.

In testimony, that I claim the foregoing as my invention, I have signed my name in presence of two witnesses, this 30th day of January A. D. 1912.

JOHN U. ADOLPH.

Witnesses:
A. H. TAYLOR,
L. C. BAYLES.